United States Patent
Chapman

(10) Patent No.: US 7,544,001 B2
(45) Date of Patent: Jun. 9, 2009

(54) BALANCING SYSTEM FOR A CAMERA CRANE

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 548 days.

(21) Appl. No.: 11/332,836

(22) Filed: Jan. 13, 2006

(65) Prior Publication Data

US 2006/0228105 A1    Oct. 12, 2006

Related U.S. Application Data

(60) Provisional application No. 60/643,817, filed on Jan. 14, 2005.

(51) Int. Cl.
  G03B 17/00  (2006.01)
  F16M 3/00  (2006.01)
  B66C 23/76  (2006.01)
(52) U.S. Cl. ............... 396/428; 212/198; 248/123.2
(58) Field of Classification Search ............. 396/428; 352/243; 248/123.11, 123.2; 212/195–198
  See application file for complete search history.

(56) References Cited

U.S. PATENT DOCUMENTS

| 2,156,862 | A | 5/1939 | Maugard |
| 4,907,768 | A | 3/1990 | Masseron et al. |
| 4,943,019 | A | 7/1990 | Mester |
| 4,952,953 | A | 8/1990 | Ridderstolpe et al. |
| 5,033,705 | A * | 7/1991 | Reagan ............ 248/123.11 |
| 5,671,932 | A | 9/1997 | Chapman |
| 5,856,862 | A * | 1/1999 | Kokush ............ 352/243 |
| 6,450,706 | B1 | 9/2002 | Chapman |
| 6,517,207 | B2 | 2/2003 | Chapman |
| 6,714,729 | B1 * | 3/2004 | Sugiura et al. ........... 396/19 |
| 6,776,488 | B2 | 8/2004 | Burbulla |
| 2003/0076480 | A1 | 4/2003 | Burbulla |

* cited by examiner

Primary Examiner—W. B. Perkey
(74) Attorney, Agent, or Firm—Kenneth H. Ohriner; Perkins Coie LLP

(57) ABSTRACT

A camera crane includes an improved balancing system having a weight bar attached to the crane arm, and balance weights moveable along the weight bar. Substantially each balance weight can have upper rollers resting on the upper surface of the weight bar, to support the balance weight on the weight bar and allowing the balance weight to roll along the weight bar. A brake may be provided on the balance weights to lock the balance weight into a selected position on the weight bar. If used, the brake may have a moveable brake pad and a brake stop. The weight bar can be attached to the crane arm via mounting bars, and with the balance weights each including a slot to allow the balance weight to move over or past the mounting bars.

12 Claims, 4 Drawing Sheets

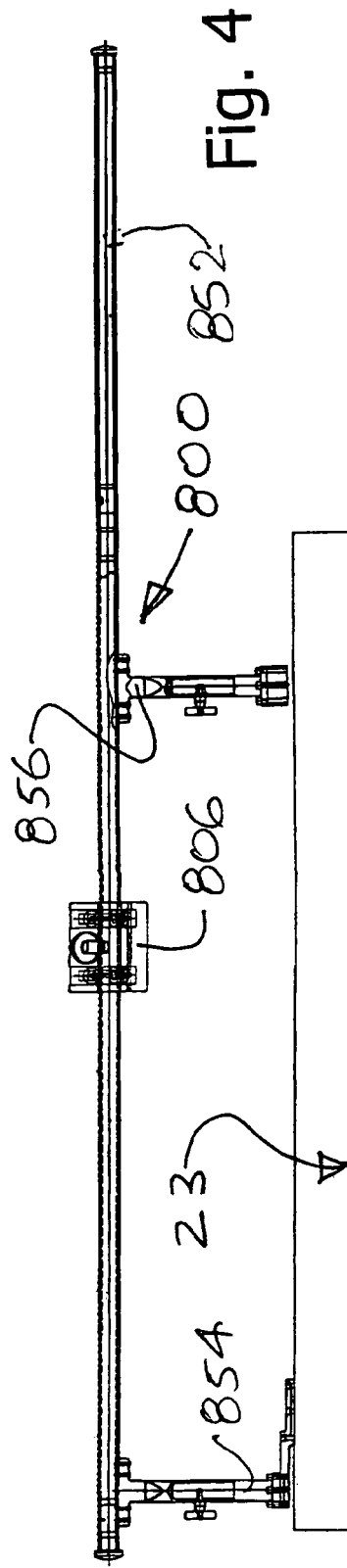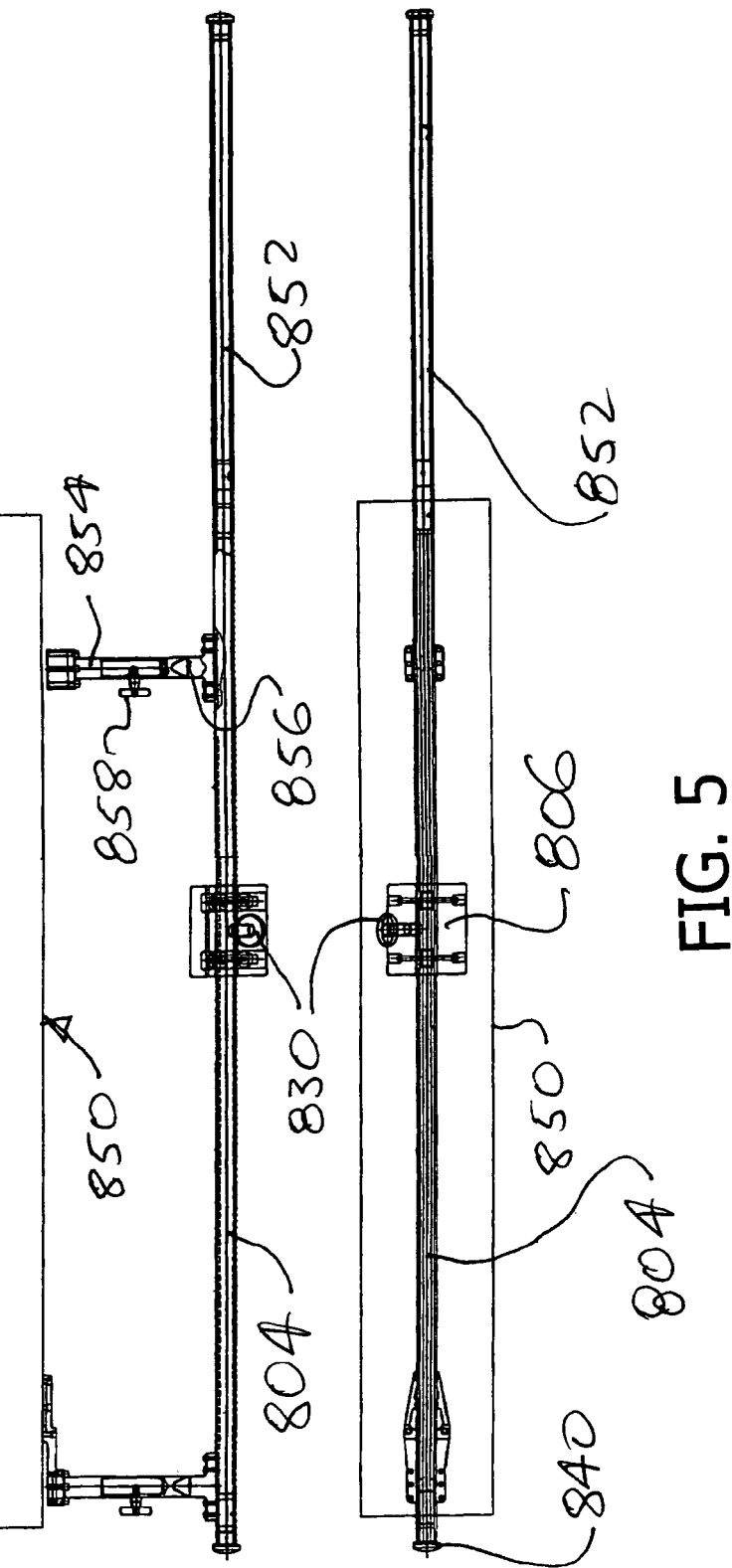

BALANCING SYSTEM FOR A CAMERA CRANE

This application claims priority to U.S. Provisional Application No. 60/643,817 filed Jan. 14, 2005.

BACKGROUND OF THE INVENTION

The field of the invention is camera cranes.

Camera cranes are used in the production of motion pictures, video, and television programs. Typically, a camera crane arm or boom is pivotably mounted onto a base, such as a mobile dolly or platform. A camera is mounted on a camera platform at the front end of the arm. Counterweights on a counterweight platform at the back end of the arm are added to try to keep the arm into a balanced, or near balanced equilibrium.

With certain crane arms, it may be difficult to adequately balance the arm by placing counterweights at the back end. The counterweights are generally provided in selected incremental weight increments, such as 50 and 100 pound weights. Accordingly, with some crane arms and payloads, the precise amount of weight on the back end cannot be readily achieved. The crane arm may also not react under load as a perfectly straight lever. The arm necessarily also deflects or sags under load. Some payloads may have eccentric force components or torque elements. Friction forces may also vary. For these and other reasons, balancing the crane arm by placing counterweights at the back end of the arm may be difficult. If the arm is not balanced, it must be held in place with a brake. However, moving the unbalanced arm into any desired position then requires greater lifting force by the crane operator. As a result, crane arm movement is generally slower, and achieving precise camera positioning becomes more difficult. Accordingly, engineering challenges remain in the design of crane arm balancing systems.

BRIEF DESCRIPTION OF THE DRAWINGS

FIG. 4 is a plan view of the crane arm balancing system shown in FIG. 2, with only the fixed crane arm section or tube shown, for clarity of illustration.

FIG. 5 is a side view of the crane arm balancing system shown in FIG. 4.

DETAILED DESCRIPTION OF THE DRAWINGS

Figure 1:
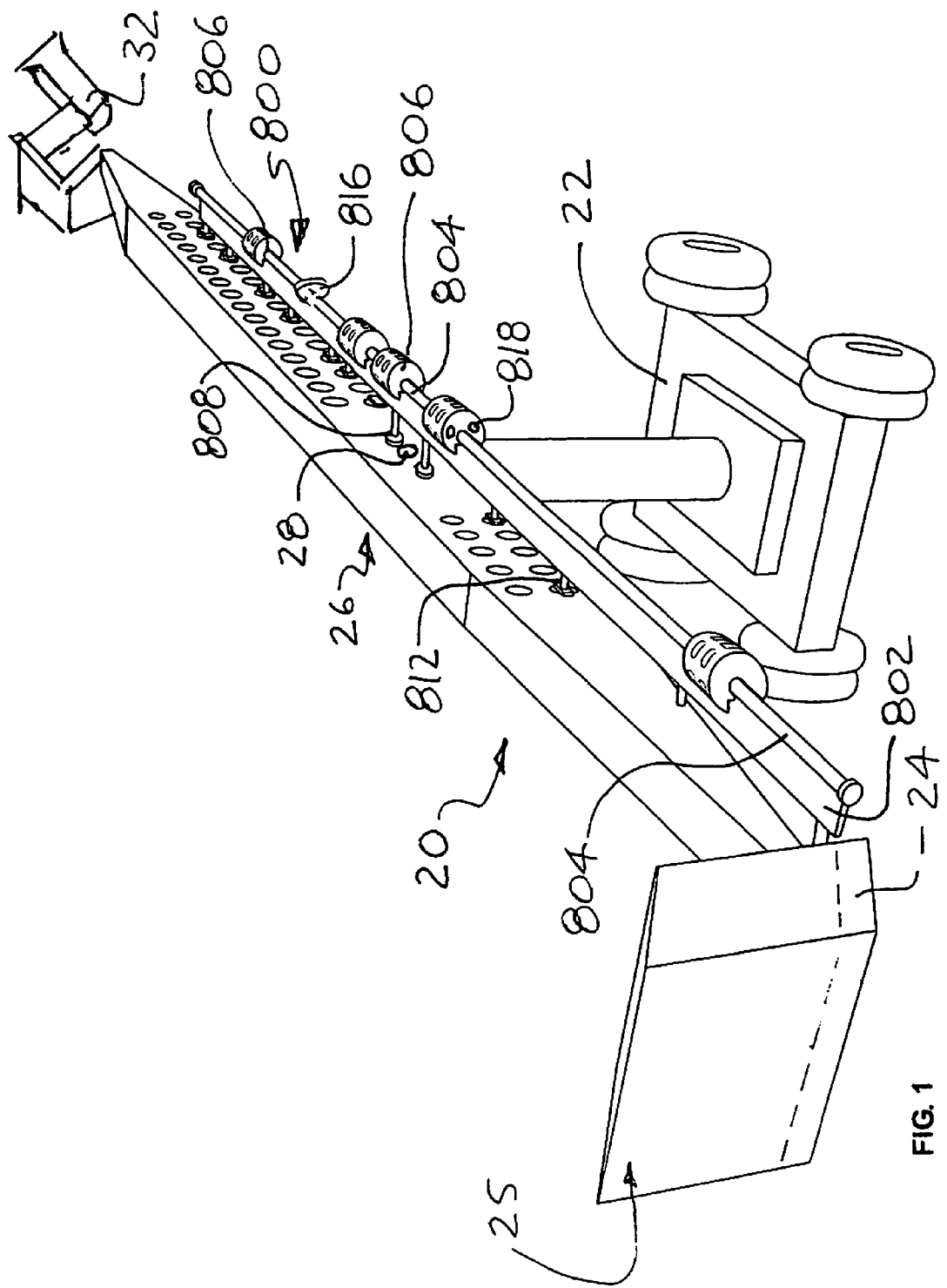
FIG. 1 is a perspective view of the present crane arm balancing system installed on a fixed length or segment/section assembled crane.

Turning now in detail to the drawings, as shown in FIG. 1, a camera crane 20 has a boom arm 26 supported on a mobile base 22. The arm 26 and base 22 are described, for example in U.S. Pat. Nos. 6,345,919 and 5,671,932, incorporated herein by reference. The arm 26 is typically assembled from arm segments resulting in an arm of the desired length, for a particular filming sequence. However, the balancing system 800 described here can be used on virtually any type of camera crane arm.

Figure 3:
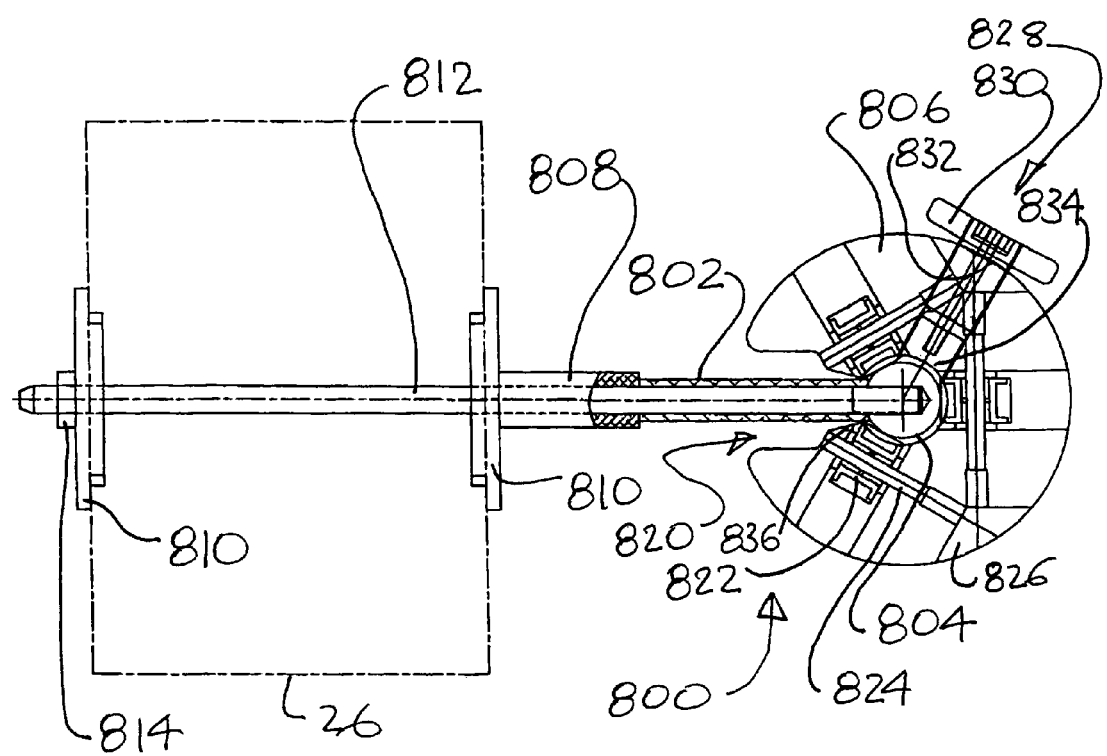
FIG. 3 is a section view of the crane arm balancing system shown in FIG. 1.

Referring to FIGS. 1 and 3, the balancing system 800 includes one or more balance weights 806 that are slidable or rollable along a bar, tube or plate, in a front/back direction. In the specific design shown in FIG. 3, a weight bar 804 extends alongside the boom arm 26. Typically the weight bar 804 will extend for about 50, 60, 70, 80, or 90% of the length of the boom arm 26. Typically, the section of the weight bar 804 behind the elevation axle 28 is shorter than the section or length of the weight bar 804 forward of the elevation axle, because the elevation axle is typically closer to the back end of the boom arm. The length of the boom arm in front of the elevation axle 28 is typically double the length of the boom arm extending behind the elevation axle.

As shown in FIG. 3, a plurality of mounting bars 812 extend laterally through the boom arm 26, washer plates 810, a spacer 808, through clearance holes in a mounting plate 802, and are threaded into the weight bar 804. A nut 814 clamps these components together and rigidly secures them onto the boom arm. The mounting bars are generally spaced from 1 to 6 feet apart, depending on the size of the boom arm and weight of the balance weights 806. Ordinarily, the mounting bars (as therefore the plate 802 and weight bar 804 are at the vertical centerline of the boom arm 26. The weight bar 804, which typically is made of metal, such as steel or aluminum, is dimensioned consistently with the size of the boom arm and loads to be carried. Outside diameters of the weight bar 804 will most often range from about ¾ to about 2 inches.

Referring still to FIG. 3, the balance weight 806 has rollers 822 on axles 824. This allows the weight 806 to roll easily along the weight bar 804. In the design shown, each weight 806 has a front set and a back set of three equally radially spaced apart rollers. Other designs having more or less rollers in various configurations may of course be used. The rollers may also be replaced with other low friction devices, such as Teflon (fluorine resins) sliding surfaces. The rollers may be contoured or radiused, to match the curvature of the outside diameter of the bar or tube 804. Alternatively, the rollers may be flat and roll either on the curved outside diameter of the bar 804, or they may be flat and roll on flat sections of the bar 804. They may also be made of a non-metal material, such as polyurethane or rubber, for smooth and quiet rolling movement along the weight bar 804.

The balance weight 806 may be formed from one or more components or sections. The balance weights 806 generally are metal, such as aluminum or steel, to provide adequate weight within a compact volume. The balance weight 806 in FIG. 3 is formed largely as a single piece aluminum cylinder body 826. The openings and holes for the rollers and axles can be machined, cast, or otherwise formed as needed. The body 826 of the balance weight 806 has a slot 820 to provide clearance around the mounting plate 802. Since the plate 802 extends into the slot 820, the balance weights 806 can rotate only slightly on the bar 804. This keeps the weights angularly aligned on the bar, with the brake knob 830 in a convenient position.

Alternatively, the bar can have a non-round shape, or the rollers 822 can roll on flattened surfaces of the bar, to prevent the balance weights 806 from turning or rotating. In some designs, rotation of the balance weights 806 may be acceptable. In these designs, the balance weights 806 may have virtually any shape and configuration, with or without rollers. In designs having only two mounting bars (a front and a rear mounting bar), the balance weights 806 need not even require clearance to move past the mounting bars. Hence, in these designs, the balance weights can even be continuous geometric shapes or masses, with no slots for clearing any plate or mounting bar.

A resilient pad 816 may be slidably supported on the bar 804 between each of the balance weights 806, to reduce noise and impact, if a weight slides or rolls into an adjacent weight 806. The balance weights may also or alternatively have resilient end bumpers 818 for the same purpose.

The number of balance weights 806 used may vary with the length of the boom arm 26 and with the payload (i.e., the weight of the camera 32 and any other loads carried by the crane), as well as with the weight of the balance weights 806 themselves. Two or more of the balance weights 806 can optionally be joined together by a linking bar or strap, so that they move together and act as a single heavy balance weight. The linking bar may be designed to keep the balance weights 806 close together, or contacting each other, or it may be designed to keep the balance weights spaced apart from each other. The linking bar can speed up use of the balancing system because it allows two or more balance weights 806 to be moved in a single action, and with using the brake 828 on only one of the weights. In the design shown in the Figures, the balance weights 806 are designed to weigh about 25-85, 35-75, 45-65 or 55 lbs. Balance weights in this range are more easily handled while also weighing enough to provide sufficient balancing forces.

As shown in FIG. 3, each of the balance weights 806 advantageously has a brake 828 to adjust the ease of movement of the weight 806 along the weight bar 804, and to generally also lock the weight 806 in place. Various techniques and designs may be used as the balance weight brake. In FIG. 3, the brake 838 includes a hand knob or lever 830 connected to a bolt or stud 832 threaded into the body 826 of the balance weight 806. A brake pad 834 at the inner end of the stud 832 is positioned to contact the weight bar 804 with increasing force, as the hand knob 830 is turned in (clockwise). A brake stop 836 is fixed in position within the body 826 of the balance weight 806 at a position opposite to the brake pad 834. A slight clearance gap separates the brake stop 836 from the weight bar 804, when little or no braking force is applied by the brake 828. When the brake 828 applies moderate or larger amounts of braking force (by tightening or turning the knob 830 further in, the brake stop 836 contacts the weight bar 804. The bar is then clamped between the brake pad 834 and the brake stop 836. This prevents the brake 828 from applying excessive force on the roller 822 positioned opposite to the brake 828. The brake pad 834 and the brake stop 836 are advantageously made of a low friction material, such as Teflon.

The balancing system 800 may be provided as permanent system on the crane 20. In can also be retrofit onto existing cranes. Alternatively, it can be provided as an accessory, which is used as needed, and then removed from the crane. In use, to install the balancing system 800 shown in FIG. 3, the crane arm 26 is first assembled and set up, typically by bolting arm segments together. The weight bar 804 and mounting plates 802 are then attached to the arm 26 via the mounting bars 812, spacers 808, washers 810 and nuts 814 as described above. Balance weights 806 are then installed onto the weight bar 804 by sliding them on from one end of the bar 804. After the balance weights 806 are installed on the bar 804, a bar stop 840 is secured at the end of the bar 804. This prevents the balance weights 806 from inadvertently coming off of the bar 804.

The plate 802 and bar 804 may each be a single piece, generally about 16-24, 18-22 or about 19 feet long. This is short enough to allow them to be transported in most trucks, and long enough to provide sufficient weight movement along the bar, in most applications. The plate 802 and bar 804 may also be provided in two or more segments or sections, which adjoin or are butted together during installation. The plate 802 is not essential and can be omitted, with the bar 804 supported by the mounting bars 812.

With the balancing system 800 installed, the crane is ready for use. The crane and balancing system can be used in many different ways. Typically, the crane arm 26 is fully loaded for use, including all payloads, and is then initially balanced by placing counterweights 24 in the counterweight bucket, platform or holder 25 at the back end of the arm. During this balancing procedure, all of the moveable balance weights 806 are moved to the back of the arm 26. With the arm balanced, the crane can be readily used to support and move the camera 32 as needed for the desired filming sequence.

Some sequences require that the camera be submerged into water, e.g., a lake, river or ocean (or into a pool or tank intended to simulate a lake, etc.). Due to buoyancy forces, as the camera and front end of the crane arm 26 are submerged, the crane arm 26 becomes out of balance. The upward acting buoyancy forces require compensating downward acting force on the front end of the arm 26, to keep the camera submerged in place. The balance weights 806 are moved forward for this purpose. Specifically, the brake 828 of each of the weights is released by turning the knob or lever 830. The weights 806 are then free to roll or slide along the weight bar 804. The weights 806 are moved forward, by hand, and are then relocked into place using the brake 828. After a sufficient number of weights have been moved forward by a sufficient distance along the bar 804, the arm 26 becomes rebalanced. The camera 32 will then remain substantially in place under water, despite the buoyancy forces. When the arm and camera are removed from underwater, the balance weights 806 are returned to their original rear position.

In the design shown in FIG. 1, on a 46 ft. crane arm 26, using six balance weights 806 each weighing 55 lbs, a shift in the center of gravity of the combined weights of 15 ft exerts a balancing force of about 115 lbs. This amount of force is generally more than enough to offset buoyancy forces during underwater filming. As shown in FIG. 3, the balancing system is typically installed only on one side of the crane arm 26. This allows the system to be used without moving back and forth under the arm to move the balance weights 806, or the need for two crane arm operators. The balancing system 800 may however be installed on both sides of the crane arm, with each side optionally a mirror image of the other, as shown in the design in FIG. 4. In some crane arms, the balancing system 800 might also be installed on the top or bottom of the arm, or both.

As the angle of elevation of the arm changes, the shape of the arm also changes. While the arm 26 is rigid, it still deflects or sags a small amount, especially when loaded. Since the arm is typically balanced while horizontal, the arm will tend to become unbalanced as the elevation angle of the arm changes, e.g., when the arm is tilted up to near vertical to achieve a high camera position. In this type of use, the arm can be quickly and easily rebalanced via the balancing system 800, by moving one or more of the balance weights. Although rebalancing can also be achieved by moving counterweights into or out of the weight bucket, this tends to be more time consuming and may also require a ladder, depending on the height of the weight bucket when rebalancing is performed. It also involves handling loose counterweights, which must be separately stored and handled, and which can be accidentally dropped. In contrast, after the balancing system 800 is installed, balancing, or rebalancing can be achieved without use of loose or free weights.

Figure 2:
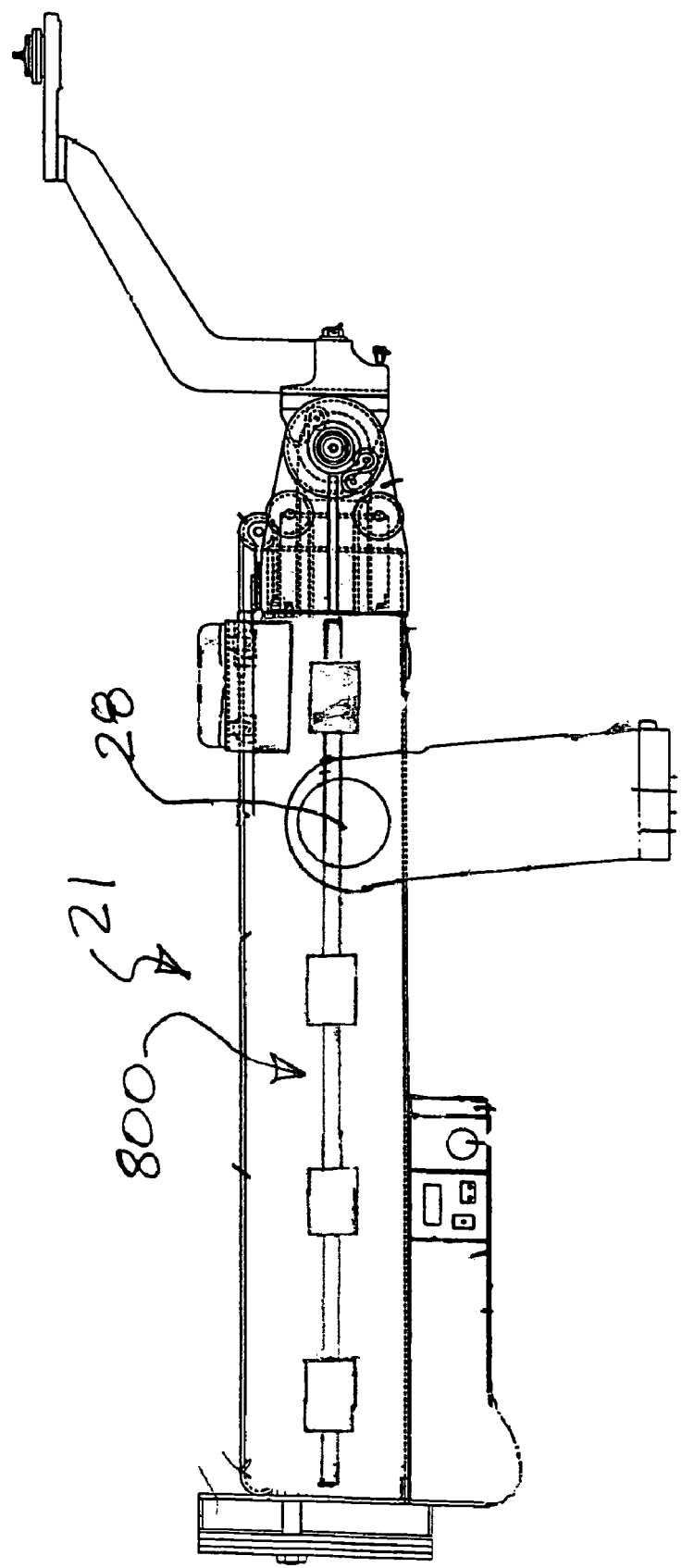
FIG. 2 is a side view of the present crane arm balancing system installed on a telescoping crane.

FIGS. 2, 4 and 5 show the balancing system 800 as used on a telescoping crane, for example as described in U.S. patent application Ser. No. 10/934,804, incorporated herein by reference. As shown in FIG. 2, the balancing system is installed on the fixed (non-telescoping) section or tube 23 of the crane arm 21, generally on the vertical centerline. With telescoping cranes, the arm sections or tubes are relatively short and the crane achieves extended reach via the telescoping movement of multiple arm sections. As shown in FIG. 4, since the fixed section is relatively short, an extension bar 854 may be attached to and extend forward from the weight bar 804. The extension bar allows for a greater range of travel for the balance weights 806. To prevent the balance weights from rotating on the bar 804, a key on the balance weight 806 may be provided and extend into a slot in the bar 804.

In the design shown in FIG. 4, no mounting plate 802 is used. The bar 804 (with the term bar here including tubes and plates) is supported on standoffs 854 or other mounting bars or fittings attached to the fixed section 23 of the crane arm 21. The standoffs 854 may be temporarily attached and removed when the balancing system is not in use, or they may be permanent parts of the crane arm 21. Front and rear sockets 856 on the bar 804 fit into or over the standoffs 854 and are locked in place with a lock knob 858. This allows the bar 804 to be quickly and easily installed and removed. The balance weights 806 are installed, and the balancing system 800 is used as described above. As shown in FIG. 4, a balancing system 800 may be installed on both sides of the crane arm 21.

Thus, novel crane arm balancing systems have been shown and described. Various changes and substitutions can of course be made without departing from the spirit and scope of the invention. The invention, therefore, should not be limited, except to the following claims, and their equivalents.

The invention claimed is:

1. A camera crane comprising:
   a crane arm;
   a weight bar supported on the crane arm via a plurality of mounting bars; and
   one or more balance weights moveable along the weight bar, with at least one of the balance weights including a slot to allow the balance weight to move over the mounting bars.

2. The camera crane of claim 1 with the balance weight comprising a plurality of rollers supporting the balance weight on the weight bar and allowing the balance weight to roll along the weight bar.

3. The camera crane of claim 1 with the balance weight comprising a brake for preventing movement of the balance weight on the weight bar.

4. The camera crane of claim 3 with the brake comprising a moveable brake pad and a brake stop.

5. The camera crane of claim 1 further comprising an extension piece attached to the weight bar.

6. The camera crane of claim 1 with the balance weight comprising a generally cylindrical shape, and with one or more bumpers on a flat front or back end of the balance weight.

7. A camera crane comprising:
   a crane arm;
   a weight bar attached to the crane arm via a plurality of mounting bars, with the weight bar having an upper surface and a stop at an end of the bar;
   balance weights moveable along the weight bar, with substantially each balance weight having:
      upper rollers resting on the upper surface of the weight bar, to support the balance weight on the weight bar and allow the balance weight to roll along the weight bar; and
      a slot providing clearance for the balance weight to move over the mounting bars;
   wherein the stop prevents the balance weight from rolling off the end of the weight bar.

8. The camera crane of claim 7 further comprising a brake on substantially each of the balance weights for preventing movement of the balance weight on the weight bar.

9. The camera crane of claim 8 with the brake comprising a moveable brake pad and a brake stop.

10. The camera crane of claim 7 wherein the upper surface is curved and the rollers are shaped to generally match the curvature of the upper surface.

11. The camera crane of claim 7 with substantially each balance weight having at least one set of lower rollers positioned adjacent to a lower surface of the weight bar.

12. A camera crane comprising:
   a crane arm;
   mounting bars extending laterally through the crane arm;
   a round weight bar attached to the mounting bars, with the round weight bar having an upper surface, a lower surface, and an outer surface opposite from the mounting bars;
   balance weights moveable along the weight bar, with substantially each balance weight having a front set of rollers and a rear set of rollers, and each of the front and rear sets of rollers having a first, a second, and a third roller, with the first, second, and third roller of each set of rollers rolling on the upper, lower, and outer surface, respectively, of the weight bar and allowing the balance weights to roll along the weight bar;
   with each of the rollers having a surface generally contoured to match the diameter of the round weight bar; and
   with substantially each balance weight having a slot facing the crane arm.

* * * * *